(12) United States Patent
Aksenov et al.

(10) Patent No.: US 11,437,154 B2
(45) Date of Patent: Sep. 6, 2022

(54) NUCLEAR FUEL ASSEMBLY HAVING A FILTER FOR RETENTION OF FOREIGN OBJECTS IN THE COOLANT

(71) Applicants: JOINT STOCK COMPANY, Moscow (RU); PUBLIC JOINT STOCK COMPANY, Elektrostal (RU)

(72) Inventors: Pyotr Mikhaylovich Aksenov, Elektrostal' (RU); Yuriy Vasil'yevich Luzan, Elektrostal (RU); Alexandr Yefimovich Lerner, Noginsk (RU); Sergey Alexandrovich Myakov, Nizhniy Novgorod (RU); Oleg Borisovich Samoylov, Nizhniy Novgorod (RU); Irina Evgen'evna Simanovskaya, Nizhniy Novgorod (RU); Dmitriy Leonidovich Shipov, Nizhniy Novgorod (RU); Evgeniy Vasil'yevich Sholin, Nizhniy Novgorod (RU)

(73) Assignees: JOINT-STOCK COMPANY "TVEL", Moscow (RU); PUBLIC JOINT STOCK COMPANY "MASHINOSTROITELNY ZAVOD", Elektrostal (RU)

( * ) Notice: Subject to any disclaimer, the term of this patent is extended or adjusted under 35 U.S.C. 154(b) by 0 days.

(21) Appl. No.: 16/618,023
(22) PCT Filed: Dec. 28, 2017
(86) PCT No.: PCT/RU2017/000999
§ 371 (c)(1),
(2) Date: Nov. 27, 2019
(87) PCT Pub. No.: WO2019/132697
PCT Pub. Date: Jul. 4, 2019

(65) Prior Publication Data
US 2020/0343007 A1    Oct. 29, 2020

(51) Int. Cl.
*G21C 3/30* (2006.01)
*G21C 3/32* (2006.01)
(Continued)

(52) U.S. Cl.
CPC .......... *G21C 3/3206* (2013.01); *G21C 19/30* (2013.01); *B01D 29/11* (2013.01); *G21C 3/30* (2013.01)

(58) Field of Classification Search
CPC ........ G21C 3/3206; G21C 19/30; G21C 3/30; B01D 29/11
(Continued)

(56) References Cited

U.S. PATENT DOCUMENTS

| 4,634,525 A | * | 1/1987 | Yant ..................... B01D 29/055 376/313 |
| 7,787,584 B2 | | 8/2010 | Park et al. |

(Continued)

FOREIGN PATENT DOCUMENTS

| EP | 1278206 | | 1/2003 | |
| JP | 2001141866 A | * | 5/2001 | ............... G21C 3/33 |

(Continued)

OTHER PUBLICATIONS

Europe Supplementary Search Report dated Oct. 29, 2021 for Application 17936879.0 filed Dec. 28, 2017 (11 pages).
(Continued)

*Primary Examiner* — Jack W Keith
*Assistant Examiner* — Daniel Wasil
(74) *Attorney, Agent, or Firm* — Dentons US LLP

(57) ABSTRACT

Fuel assemblies of nuclear reactors that increase the efficiency of a filter for retention of foreign objects in the coolant while maintaining the hydraulic resistance of the fuel assembly at the same level. The nuclear reactor's fuel assembly comprises a head, a fuel elements bundle, spacer grids and the filter for retention of the foreign objects. The filter is installed in the bottom nozzle of a fuel assembly and is made in the form of rectilinear plates' groups, located in the cross section of the bottom nozzle.

3 Claims, 4 Drawing Sheets

(51) Int. Cl.
*G21C 19/30* (2006.01)
*B01D 29/11* (2006.01)

(58) Field of Classification Search
USPC .................................................. 376/313, 352
See application file for complete search history.

(56) References Cited

U.S. PATENT DOCUMENTS

| | | | |
|---|---|---|---|
| 8,317,035 B2 | 11/2012 | Elkins et al. | |
| 2007/0256834 A1* | 11/2007 | Hopkins | E21B 43/082 |
| | | | 166/278 |
| 2013/0248434 A1* | 9/2013 | Owaki | G21C 3/3206 |
| | | | 210/236 |
| 2019/0066854 A1* | 2/2019 | Smith | G21C 3/3206 |

FOREIGN PATENT DOCUMENTS

| | | | |
|---|---|---|---|
| RU | 2264666 | 11/2005 | |
| RU | 2610716 C1 * | 2/2017 | ............ G21C 3/30 |
| WO | WO2010007544 | 1/2010 | |
| WO | WO2016190754 | 12/2016 | |

OTHER PUBLICATIONS

International Search Report and Written Opinion dated Sep. 13, 2018 for International Application PCT/RU2017/000999 filed Dec. 28, 2017 (5 pages).

* cited by examiner

NUCLEAR FUEL ASSEMBLY HAVING A FILTER FOR RETENTION OF FOREIGN OBJECTS IN THE COOLANT

CROSS-REFERENCE TO RELATED APPLICATIONS

This application is a U.S. 371 application from PCT/RU2017/000999 filed Dec. 28, 2017, the technical disclosure of which is hereby incorporated herein by reference.

FIELD OF THE INVENTION

The invention relates to nuclear-power engineering and, in particular, to fuel assemblies of nuclear reactors.

BACKGROUND OF THE INVENTION

From the prior art there is known the design of the nuclear reactors VVER-440, VVER-1000 fuel assembly (see P. L. Kirillov and colleagues Handbook on thermohydraulic calculations (nuclear reactors, heat exchangers, steam generators). M: Energoatomizdat, 1990, fig. P. 8.1, P. 8.3 и P. 8.5, p. 317-319), which comprises fuel elements 1 bundle, arranged in a triangular net, fixed in the lower carrier grid 7 and connected between each other by spacer grids 2, fixed on the central pipe 9. In the VVER-1000 FA spacer grids are also fixed to angle elements 3, fastened with screws 6 to the bottom nozzle 4. In the TVS-2M FA spacer grids are fixed to guide channels 8. There is a head 5 for providing loading and unloading of a fuel assembly in all designs of fuel assemblies.

Known fuel assembly of a nuclear reactor (see the patent US20090092217 dated May 29, 1996, G21C3/322), comprises a head, a bottom nozzle, a fuel elements bundle, arranged in a rectangular net, fixed in the carrier grid and connected between each other by spacer grids, a filter in the head, intended to prevent entering into the coolant by structural elements of the fuel assembly, for example, the destruction of spacer grids' inconel inserts in the event of their destruction and falling into the fuel elements bundle.

The function of this filter is similar to the function of the VVER-440 working cassette baffle grid (see the patent RU2364962 dated Apr. 24, 2008, G21C3/00), that is also intended for retention of fragments of the structural elements of a fuel assembly in the hypothetical event of their destruction.

However, the working cassette has a cover, and in this case the presence of a baffle grid isolates the fuel assembly fragments from entering the reactor circuit, but for a fuel assembly without a cover there is a probability of dropping fragments out of the fuel elements bundle into the reactor circuit through the gap between the fuel assemblies, which makes such more complexity in a design of a fuel assembly not justified, considering the practical effect.

Wherein the filter in a known fuel assembly cannot trap foreign objects (not related to the structural elements of the fuel assembly) at the inlet to the fuel assembly, which objects, as practice shows, are present in the coolant and can cause damage to the structural elements of fuel assemblies (for example, to fuel elements claddings) during the operation.

The carrier grid in the working cassette of VVER-440 nuclear reactor is hexagon-shaped and it has 126 round apertures for installing fuel elements, a central aperture for installing a central pipe, 102 apertures in the shape of a "dumbbell" for the coolant flow, 12 apertures with a minimal diameter of 5.9 mm and semi-apertures along the contour of the carrier grid for the coolant flow. The apertures of a "dumbbell" type are formed by two apertures with a minimal radius of 2.95 mm, connected by an aperture with a minimal width of 5 mm. Apertures for installing fuel elements and a centralpipe have a diameter of $5^{+0.1}$ mm, wherein there are seven apertures for the fuel elements bottom plugs located along the contour of each face of the hexagon-shaped carrier lower grid (see B. D. Dementiev Nuclear power reactors. M: Energoatomizdat, 1990, p. 31-35). The carrier grid RK-3 of VVER-440 nuclear reactor has additionally round apertures for installing carrier pipes.

The lower carrier grid of VVER-1000 nuclear reactor fuel assembly has a similar design, it has additionally round apertures for installing guide channels.

Functionally, the lower grid is a carrier force element, holding a fuel elements bundle in a stationary mode and during transport-technological operations, and in the VVER-1000 nuclear reactor fuel assembly it also provides loading and unloading of the fuel assembly, using guide channels.

The significant disadvantage of known carrier grids is their ability to pass over foreign objects of large dimensions together with the coolant flow. For example, the large width and length of the standard carrier lower grid's spillway apertures allows passing over foreign objects into the fuel elements bundle—cylindrical items with a diameter of up to 6.3 mm and flat items with a width up to 13.4 mm at a thickness of up to 5.2 mm. The carrier grid with round spillway apertures and the carrier grid of "daisy wheel" type for TVS-2M FA also do not have the required anti-debris properties and pass over long cylindrical foreign objects up to the size of 7.18 mm and 6.63 mm in the transverse direction respectively.

It is confirmed by experimental studies that existing designs of a carrier grid have an effectiveness of 50 . . . 60% in retention for foreign objects of arbitrary shape, which is not enough, as it is clear from practice, because the depressurization of fuel elements claddings due to this reason is ~56% of the total number of failures.

In this regard, a need arises to equip fuel assemblies with additional anti-debris filters, installed in the bottom nozzle of a fuel assembly, to trap foreign objects in the coolant.

Currently, nuclear reactor's fuel assemblies have anti-debris filters.

In the TVS-2M project for the VVER-1000 nuclear reactor, the anti-debris filter had been developed, comprising 12 perforated plates, installed at a certain angle to each other, using additional fins, to form a complex spatial design, wherein a large length of welds reduced the reliability of welded joints.

There were also proposals to equip the standard carrier lower grids with additional rods, made of wire 1.5 . . . 2 mm, welded onto the lower surface of the grid in the area of spillway apertures, which is practically impossible to realize in mass production conditions.

Such designs of anti-debris filters had been studied by EREC JSC and the research results had been presented at the 7th International Scientific and Technical Conference "Safety, Efficiency and Economics of Nuclear-Power Engineering", Moscow, May 26-27, 2010 in the report "Experimental study of the effectiveness for anti-debris filters of VVER-1000 cassettes".

Comparative studies of anti-debris filters' various designs, performed by EREC JSC, have shown, that the effectiveness of the foreign objects retention for the TVS-2M anti-debris filter is 77.9%, and for the FA anti-debris filter—79.1%, i.e. it increases to nearly 80%.

Wherein, however, also the pressure drop of the coolant at the inlet section of the fuel assembly increases by 1.45 . . . 1.65 times in comparison to the pressure drop on the carrier lower grid.

It is known the fuel assembly design (see the U.S. Pat. No. 5,481,578 dated Jan. 2, 1996, G21C3/31), the filter of which is a field of perforated bushings of small diameter, installed along the coolant flow, wherein the perforation of the bushings is perpendicular to the flow. The bushings are fixed between two perforated plates. Functionally, the trapping of foreign objects by such a filter is implemented by changing the direction of the coolant flow and organizing the passage of coolant through the small apertures in the bushings. The disadvantage of this design is the manufacturing complexity due to presence of a large number of small parts (bushings) and the need for their perforation. This design will have a significant hydraulic resistance due to the fact that the flow changes its direction twice by 90° as it passes through the filter.

It is known the fuel assembly design (the U.S. Pat. No. 5,867,551 dated Feb. 2, 1999, G21C3/30), in which the filter constructively performs in addition the functions of the base plate and this filter is a wavy plate. There are two types of grooves, made in the plate's waves: in the shape of a cross and in the shape of a circle, divided into 4 sectors. The technological complexity of the plate manufacturing can be considered as this structure disadvantage; the plate has a complex spatial shape, as the "wave" does not pass through the entire cross section of the plate, but forms local peaks and troughs, in which the grooves are made.

There is known the fuel assembly with the filter (the patent WO 98/28752 dated Dec. 20, 1996, G21C3/32), which is a plate with cylindrical apertures, made in it. To solve the problem of through apertures blockage by foreign objects, there are conical non-through grooves made in this design along the rows of apertures, "covering" the part of apertures. In case foreign objects capturing by such a groove, this object will tend to move to the center of the groove, thus freeing the area of the cylindrical aperture and not reducing the flow area.

The disadvantage of this design is a need to have small diameter of the apertures to increase the efficiency of the filter (the ability to trap smaller particles). At reducing the through apertures diameter, the hydraulic resistance of the fuel assembly increases.

The disadvantage of all known designs for filters is that they cannot be made by machining, since they have narrow slots, small diameter apertures, rather thin bridges between them, which results in the manufacturing complexity.

The closest analogue of the proposed fuel assembly is a nuclear reactor's fuel assembly, comprising a head 5, a fuel elements bundle 1 and guide channels 8, spacer grids 2, an anti-debris filter, installed in the bottom nozzle 4, which is a perforated plate with apertures in the form of grooves, having the shape of the V symbol (RU 2264666 dated Jan. 16, 2004, G21C3/30).

The disadvantage of this anti-debris filter is the small, 0.3 . . . 0.6 mm, thickness of the bridges between the apertures at a plate thickness of 6 . . . 8 mm.

The manufacturing of this anti-debris filter both by the electro-erosion method and by means of water jet cutting leads to large labor costs.

Wherein the known design of the anti-debris filter, having a rather high efficiency when it comes to curvilinear foreign objects, is practically ineffective against foreign objects in the form of rectilinear rods and flat objects of large width of any length, having a thickness of less than 2 mm.

SUMMARY OF THE INVENTION

The object of this invention is to increase the efficiency of the anti-debris filter while maintaining the hydraulic resistance of the fuel assembly at the same level.

The technical result of the invention is the reliability enhancement and working ability enhancement of a nuclear reactors' fuel assembly by improving the design of the anti-debris filter.

This technical result is achieved by the design, wherein the nuclear reactor's fuel assembly comprises a head 5, a fuel elements bundle 1, spacer grids 2 and an anti-debris filter 10 for the foreign objects retention. The anti-debris filter is installed in the bottom nozzle of a fuel assembly and is made in the form of rectilinear plates' groups, located in the cross section of the bottom nozzle.

EMBODIMENT OF THE INVENTION

The upper 13 and lower 15 groups of plates are placed at an angle to the longitudinal axis of the fuel assembly 11 and connected by the middle 14 group of plates, which are parallel to the longitudinal axis of the fuel assembly with the formation, along the longitudinal axis of the fuel assembly, of rectangular cross section channels 16-17 for the passage of coolant. Wherein the channels, formed by the upper and middle groups of plates, are located at an angle of 23 to the longitudinal axis of the fuel assembly, comprising 0 . . . 15°. The channels, formed by the middle and lower groups of plates, are located at an angle of 24 to the longitudinal axis of the fuel assembly, comprising 15 . . . 25°, with an incline, opposite to the incline of the channels, formed by the upper and middle groups of plates.

The upper and lower groups of plates are located along the longitudinal axis of the fuel assembly 11 with a gap of 21.

The channels, formed by the upper and middle groups of plates, are offset relative to the channels, formed by the middle and lower groups of plates, in the direction, perpendicular to the longitudinal axis of the fuel assembly.

Anti-debris filter 10 can be installed in the cross section of the bottom nozzle at the inlet or at the outlet of the coolant from the bottom nozzle.

Channels for the passage of the coolant, in the shape of a rectangle, have a cross section with a height of 2 . . . 3 mm and a width of 7 . . . 10 mm.

The channels profile has the shape of a broken straight line and a total height of the anti-debris filter is 10 . . . 15 mm.

The filtering of foreign rectilinear objects, entering with the flow of coolant 12 into the filter channels, with their further turning inside the channels, is provided by the presence in the anti-debris filter of channels, formed by the upper and middle groups of plates and located at an angle of 0 . . . 15° to the longitudinal axis of the fuel assembly, and channels, formed by the middle and lower groups of plates and located at an angle of 15 . . . 25° to the longitudinal axis of the fuel assembly with an incline, opposite to the incline of the channels, formed by the upper and middle groups of plates; the location of the upper and lower groups of plates along the longitudinal axis of the fuel assembly with a gap and the offset of the channels, formed by the upper and middle groups of plates relative to the channels, formed by the middle and lower groups of plates in the direction, perpendicular to the longitudinal axis of the fuel assembly.

Such a design of the anti-debris filter provides increased efficiency against foreign objects in the form of rectilinear rods and flat objects of any length, having a thickness of less than 2 mm.

Wherein, the location of the filter channels at a smaller angle to the longitudinal axis of the fuel assembly at the outlet of the coolant flow from it results to the direction of the coolant flow at the outlet from the anti-debris filter to the longitudinal axis of the fuel assembly, which contributes to the reduction of the hydraulic resistance coefficient, vibration and hydraulic loads in the lower part of the fuel assembly and fuel rods.

The thickness of the anti-debris filter plates is 0.5 . . . 1.0 mm. The plates are connected to each other "groove in the groove". For increasing the joints strength and the elements rigidity of an anti-debris filter, the plates can be welded to each other, as well as to the rim 22 by means of laser, electron-beam or argon-arc welding.

The claimed anti-debris filter can be made of stainless steel type X18H10T with the use of modern digital high-performance gas-laser cutting technology, mastered in mass production. This anti-debris filter also can be made of stainless steel, using additive technologies.

BRIEF DESCRIPTION OF THE DRAWINGS

The invention is illustrated by drawings.

Figure 1:
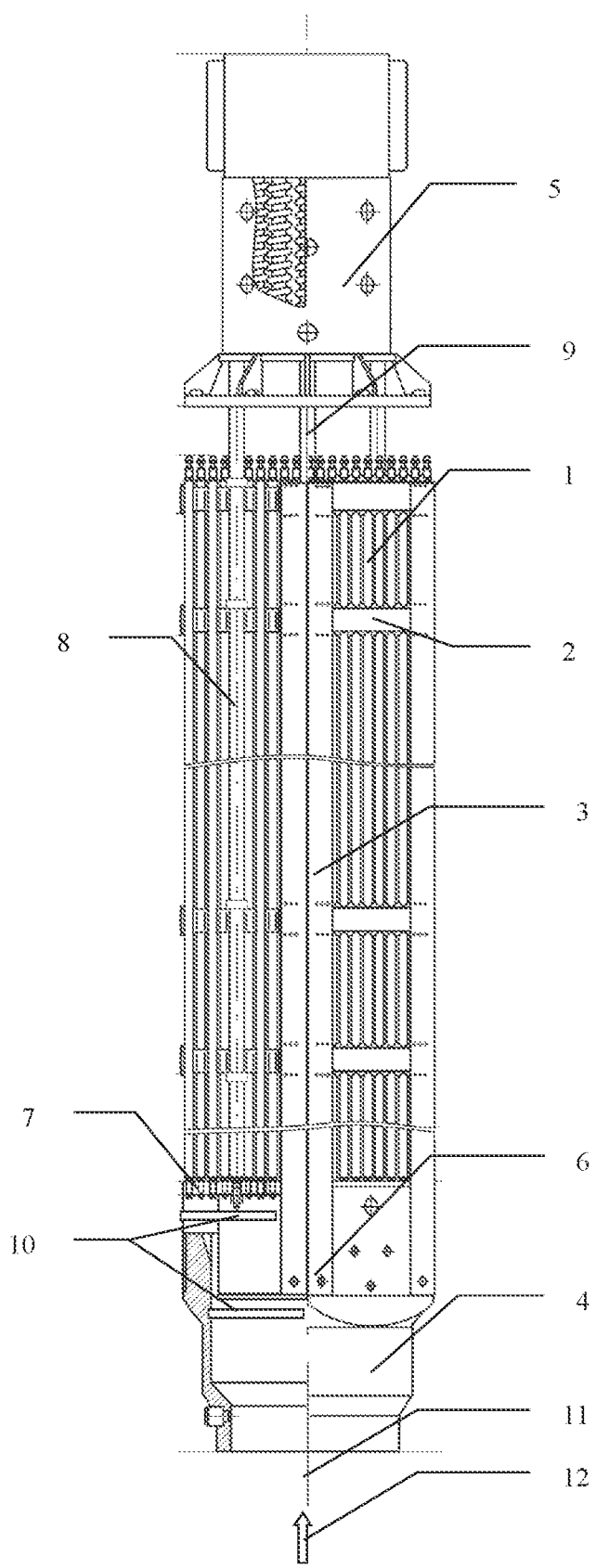
FIG. 1 is a nuclear reactor's fuel assembly.
Figure 2:
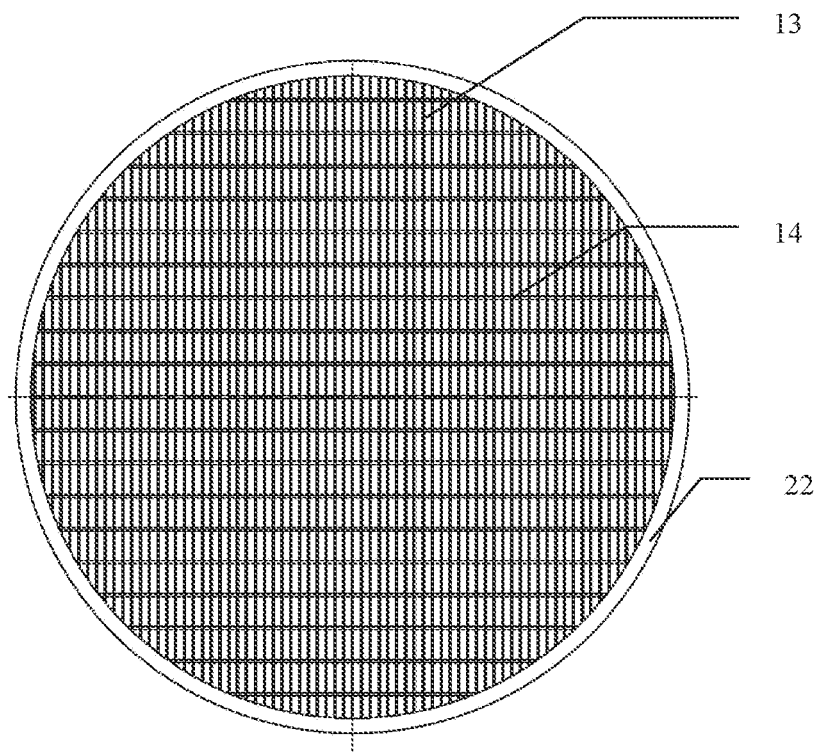
FIG. 2 is a fuel assembly anti-debris filter of a round shape (top view).
Figure 3:
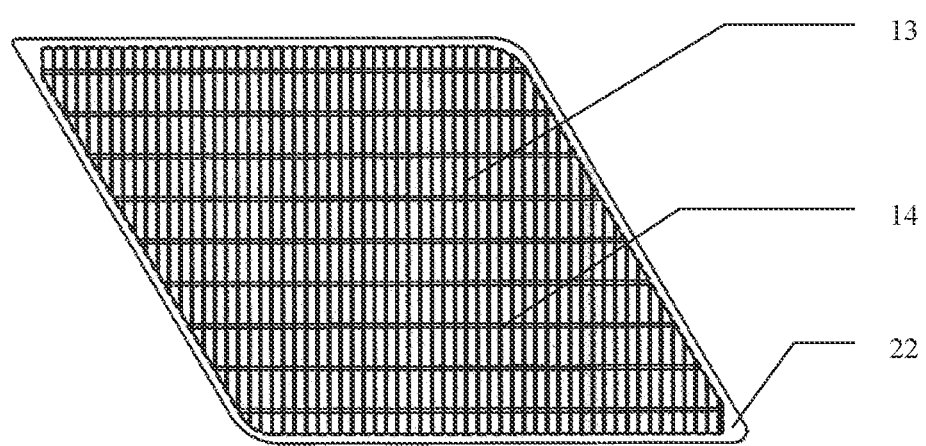
FIG. 3 is a fuel assembly anti-debris filter of a rhombic shape (top view).
Figure 4:
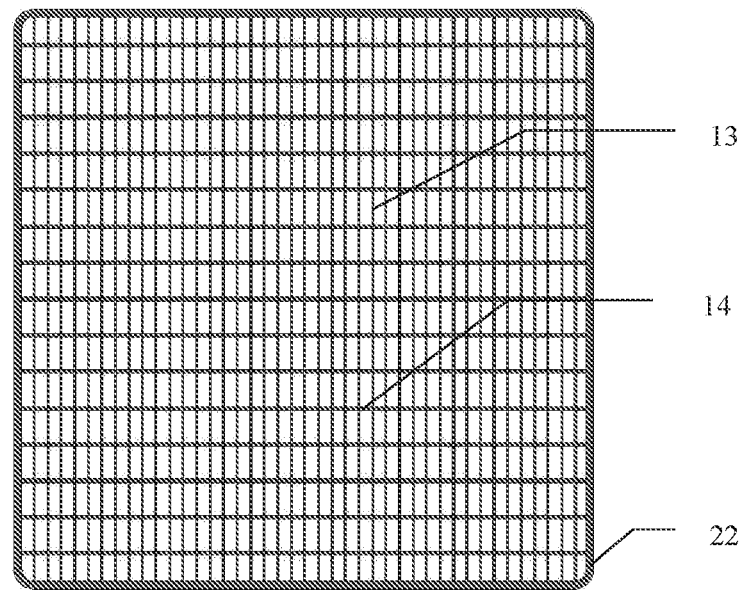
FIG. 4 is a fuel assembly anti-debris filter of a square shape (top view).
Figure 5:
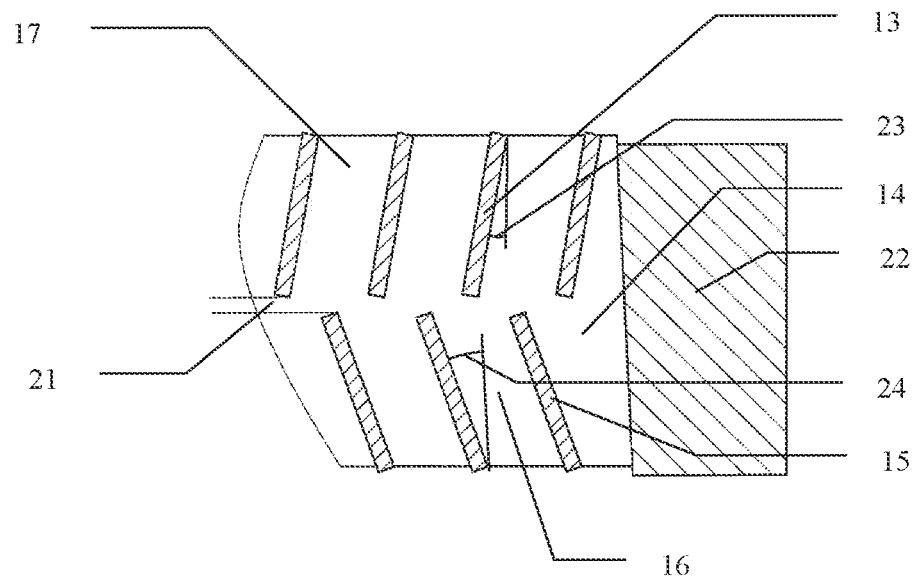
FIG. 5 is a design of a fuel assembly's anti-debris filter.
Figure 6:
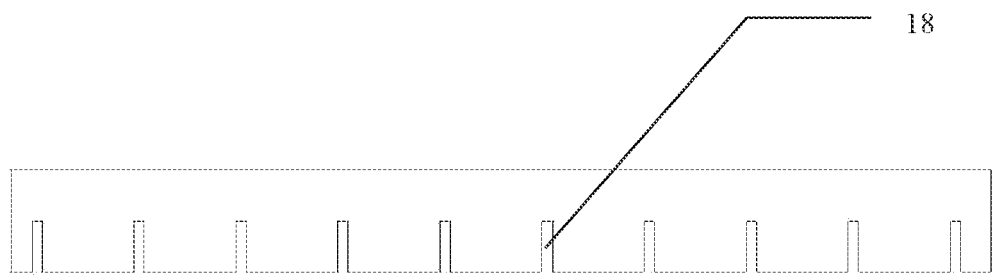
FIG. 6 is a plate of the upper group of a fuel assembly's anti-debris filter.
Figure 7:
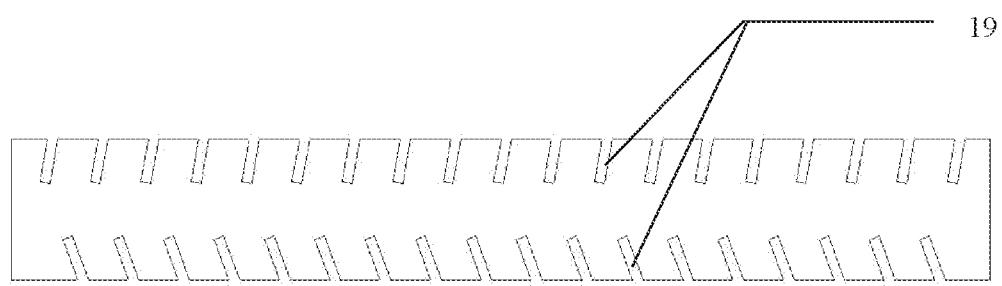
FIG. 7 is a plate of the middle group of a fuel assembly's anti-debris filter.
Figure 8:
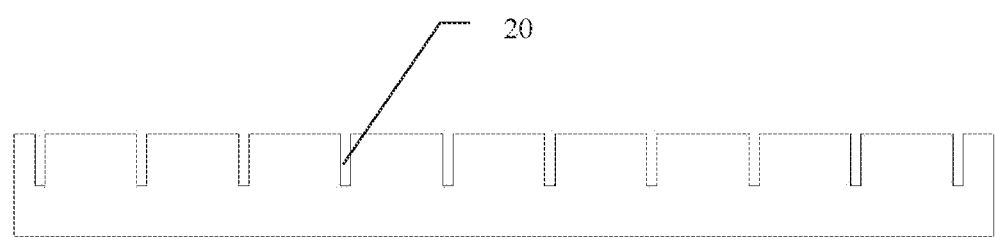
FIG. 8 is a plate of the lower group of a fuel assembly's anti-debris filter.

The anti-debris filter comprises plates of three groups: the upper group of plates with lower grooves 18, the middle group of plates with double-sided skewed grooves 19, and the lower group of plates with upper grooves 20, forming channels 16-17 for the coolant flow.

The invention claimed is:

1. A nuclear reactor fuel assembly, comprising: a head, a fuel elements bundle, a spacer grid, and a filter for retention of foreign objects in the coolant installed in a bottom nozzle of the fuel assembly;
    wherein the structure of the filter comprises an upper linear plate assembly, middle linear plate assembly and lower linear plate assembly;
    the upper and lower linear plate assemblies each placed at a respective angle to the longitudinal axis of the fuel assembly and connected by the middle linear plate assembly, the middle linear plate assembly being parallel to the longitudinal axis of the fuel assembly;
    the linear plate assemblies forming channels of rectangular cross-section along the longitudinal axis of the fuel assembly, the channels comprising upper channels and lower channels, the upper channels formed by the upper and middle linear plate assemblies and oriented at an angle greater than 0° and no more than 15° relative to the longitudinal axis of the fuel assembly, the lower channels formed by the middle and lower linear plate assemblies and oriented at an angle of 15 to 25° relative to the longitudinal axis of the fuel assembly, the lower channels and the upper channels being inclined away from the longitudinal axis in opposite directions; and
    the upper and lower plate assemblies being separated by a gap, the upper channels formed by the upper and middle plate assemblies are offset relative to the lower channels formed by the middle and lower plate assemblies, in a direction that is perpendicular to the longitudinal axis of the fuel assembly.

2. The nuclear reactor fuel assembly according to claim 1, wherein the filter is made of stainless steel of type X18N10T (Russian "X18H10T").

3. The nuclear reactor fuel assembly according to claim 2, wherein the filter is made using additive technologies.

* * * * *